(12) United States Patent
Belz et al.

(10) Patent No.: US 8,749,428 B2
(45) Date of Patent: Jun. 10, 2014

(54) VIRTUAL UNIVERSAL REMOTE CONTROL

(71) Applicant: AT&T Intellectual Property I, L.P., Atlanta, GA (US)

(72) Inventors: Steven M. Belz, Cedar Park, TX (US); James Pratt, Round Rock, TX (US); Marc Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/691,314

(22) Filed: Nov. 30, 2012

(65) Prior Publication Data

US 2013/0099954 A1 Apr. 25, 2013

Related U.S. Application Data

(63) Continuation of application No. 12/327,513, filed on Dec. 3, 2008, now Pat. No. 8,350,744.

(51) Int. Cl.
*H04L 17/02* (2006.01)
*H04N 5/44* (2011.01)

(52) U.S. Cl.
USPC .......................................... 341/176; 348/734

(58) Field of Classification Search
USPC .......................................... 341/176; 348/734
See application file for complete search history.

(56) References Cited

U.S. PATENT DOCUMENTS

| 5,886,753 | A | 3/1999 | Shinyagaito et al. |
|---|---|---|---|
| 6,108,031 | A | 8/2000 | King et al. |
| RE37,000 | E | 12/2000 | Shinyagaito et al. |
| 6,611,739 | B1 | 8/2003 | Harvey et al. |
| 6,874,152 | B2 | 3/2005 | Vermeire et al. |
| 6,909,378 | B1 | 6/2005 | Lambrechts et al. |
| 7,143,017 | B2 | 11/2006 | Flynn et al. |
| 7,783,367 | B2 * | 8/2010 | Hwang et al. ............ 700/23 |
| 2003/0236654 | A1 | 12/2003 | Flynn et al. |
| 2004/0049524 | A1 | 3/2004 | Toyota et al. |
| 2005/0231414 | A1 | 10/2005 | Chu et al. |
| 2005/0273806 | A1 | 12/2005 | Herrmann |
| 2006/0126643 | A1 | 6/2006 | Satou et al. |
| 2006/0253555 | A1 | 11/2006 | Leung |
| 2007/0027959 | A1 | 2/2007 | Harris et al. |
| 2007/0050054 | A1 | 3/2007 | Guruparan et al. |
| 2007/0107030 | A1 | 5/2007 | Zigmond |
| 2007/0260331 | A1 | 11/2007 | Rouhier et al. |
| 2007/0271078 | A1 | 11/2007 | Flynn et al. |
| 2008/0010482 | A1 | 1/2008 | Tsang |
| 2008/0152179 | A1 | 6/2008 | Huang |

\* cited by examiner

*Primary Examiner* — Scott Bauer
(74) *Attorney, Agent, or Firm* — Jackson Walker L.L.P.

(57) ABSTRACT

A method for providing a virtual, universal remote control feature includes displaying a virtual remote interface for an electronic device. A user interaction with an element of the virtual remote interface is detected. The virtual remote interface element is mapped to a device-function code. The device-function code is provided to a code transmitter. The device-function code corresponds to a control command associated with the electronic device.

15 Claims, 6 Drawing Sheets

|   | 412 | 414 | 416 |
|---|---|---|---|
|   | DEVICE | TECHNOLOGY | PROFILE FILENAME |
| 410-1 | TV | IR | TV.DC1 |
| 410-2 | STB | IR | STB.DC1 |
| 410-3 | AMP | BLUETOOTH | AMP.DC1 |
|   | ⋮ | ⋮ | ⋮ |
| 410-N |   |   |   |
|   |   |   |   |

|   | 512 | 514 | 516 | 518 |
|---|---|---|---|---|
|   | ELEMENT TYPE | TEXT | POSITION | DEVICE FUNCTION CODE |
| 510-1 | BUTTON | MUTE | 41.7, -12.8 | 0xA2F5 |
| 510-2 | BUTTON | EPG | -41.7, -12.8 | 0x13D2 |
| 510-3 | BUTTON | 1 |   |   |
|   | ⋮ | ⋮ | ⋮ | ⋮ |
|   | BUTTON | 9 |   |   |
|   | BUTTON | * |   |   |
|   | BUTTON | 0 |   |   |
|   | BUTTON | # |   |   |
|   | L ARROW | — |   |   |
|   | R ARROW | — |   |   |
|   | ⋮ |   |   |   |
| 510-N | TOGGLE SWITCH |   |   |   |

VIRTUAL UNIVERSAL REMOTE CONTROL

The present patent application is a continuation of U.S. patent application Ser. No. 12/327,513, filed Dec. 3, 2008, the entirety of which is hereby incorporated by reference.

BACKGROUND

1. Field of the Disclosure

The present disclosure relates to remote control devices and, more particularly, universal remote control devices.

2. Description of the Related Art

Remote control devices enable remote operation of machines. Conventional remote control devices are ubiquitous in the field of consumer electronics. Generally speaking, such devices are characterized by a large number of function buttons or other types of control elements where at least some of the buttons correspond to device-specific functions, device specific device-function codes, or both.

DESCRIPTION OF EXEMPLARY EMBODIMENTS

Universal remote controls for consumer electronic equipment enable consumers to control multiple devices with a single device-functionality that consistently rates as one of the most desired features on a remote control. Conventional universal remote controls, however, frequently undermine their universal characteristics with over-implemented, device-specific functionality in an effort to be all things to all users.

Disclosed herein is a universal remote control system that accommodates device specialty with a remote control device that is universal from an operational and "look and feel" perspective. In some embodiments, device specific functionality is embedded in virtual interfaces that are presented to the user on a display screen while the user-controlled remote control hardware itself is universal with respect to all devices and device types. Thus, disclosed embodiments may employ a limited function remote control device in conjunction with software-implemented virtual user interfaces that support any degree of device specialization.

In some embodiments, for example, the remote control device itself may have a tightly controlled and limited number of control elements. An exemplary remote control might, for example, employ five or fewer control elements. The control elements in such embodiments might be limited to control elements for controlling the location of a cursor or otherwise highlighting a control element of a virtual interface and a control element for selecting or otherwise asserting a highlighted control element. Such functionality might be achieved, for example, with a select button and a scroll wheel or 4-way direction controller.

The limited input remote control device may be used in conjunction with a software-based or virtual universal remote control (VURC) application that runs on a set top box (STB) or other type of customer premise equipment (CPE). The VURC application may be configured to display a virtual remote device interface (VRDI) on a display device based on information contained in a device profile. The VURC application may support profiles for a plurality of different devices or device types.

The CPE may include a network connection enabling it to access an updated library of codes thereby allowing the control of devices that are manufactured at a later time. In some embodiments, a device profile may encompass features of multiple devices whereby a single remote control action could activate multiple controls to complete a sequence of tasks (e.g., dimming the lights, switching audio feeds, muting the phone, and playing my favorite playlist all with the touch of a single button). The VURC application may retrieve device-function codes and other updates to device profiles from a device-specific remote control, i.e., a remote control dedicated to the device.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
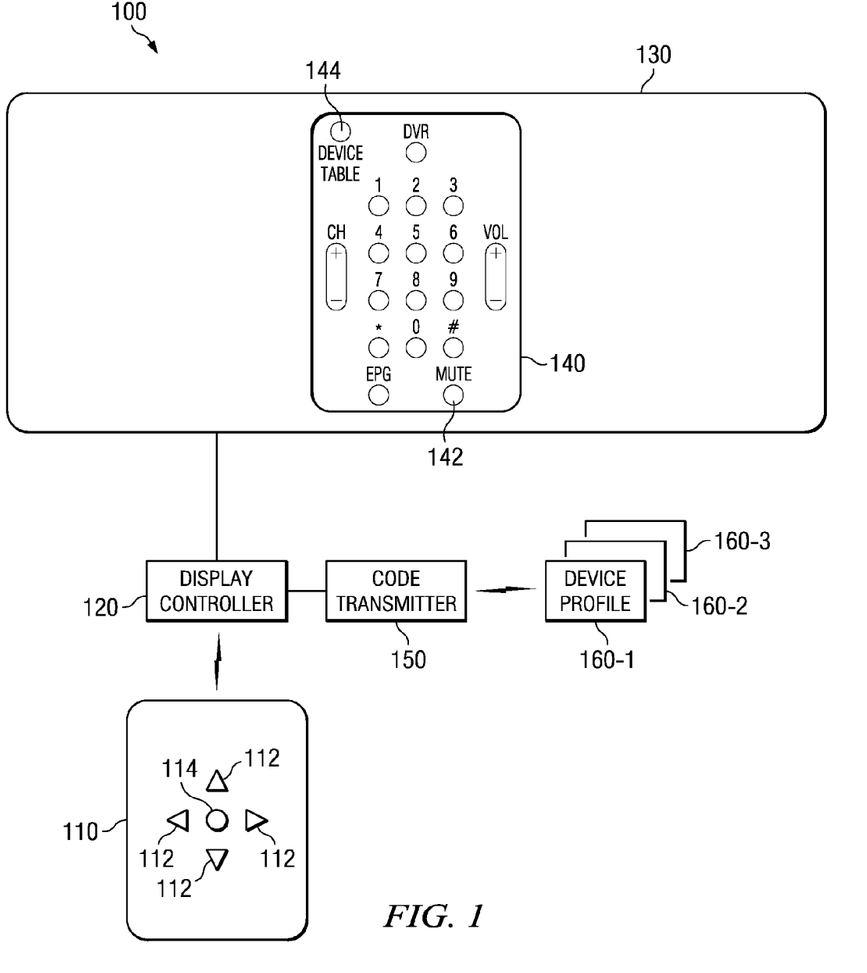
FIG. 1 is a block diagram of selected elements of an embodiment of a system for implementing virtual universal remote control of one or more electronic devices.

Turning now to the drawings, FIG. 1 depicts selected elements for implementing an embodiment of a VURC system 100. The embodiment of VURC system 100 depicted in FIG. 1 includes a VURC device 110, a display controller 120, a display device 130, and a code transmitter 150. Although these elements are depicted as distinct elements in FIG. 1, two or more of the elements depicted in FIG. 1 may be integrated or otherwise provided within a single physical device. For example, display controller 120 and display device 130 may be integrated in a single unit, display controller 120 and code transmitter 150 may be integrated in a single unit, and so forth.

In the depicted embodiment, VURC device 110 is configured with a reduced set of function elements. For example, in some embodiments of VURC device 110, the buttons or other types of control elements may be limited to a set of two or more directional elements 112 and a selection element 114 for asserting or otherwise invoking a command. Implementing VURC device 110 in this manner beneficially reduces the amount of hardware and software encoding that VURC device 110 is required to have thereby likely reducing its manufacturing cost.

In the embodiment depicted in FIG. 1, remote control functionality is supported by a software-implemented interface, depicted and identified in FIG. 1 as VRDI 140, that is presented to the user via display device 130. A VURC application, depicted in FIG. 2, generates VRDIs such as VRDI 140 from information stored in a set of one or more devices profiles 160, three of which are depicted as device profiles 160-1, 160-2, and 160-3 in FIG. 1.

A user or viewer of display device 130 employs VURC device 110 to transmit direction and selection signals to display controller 120 and thereby interact with a VRDI 140 that corresponds to a particular electronic device. When the user asserts a control element 142 VRDI 140, the VURC application consults a device profile 160 corresponding to the applicable electronic device to retrieve a device-function code corresponding to the asserted control element. The VURC application then sends the device-function code to code transmitter 150, which, as depicted in FIG. 1, is connected to or otherwise in operable communication with display controller 120. Although control element 142 is shown as being associated with a mute button in FIG. 1, control element 142 may be associated with any of the elements of VRDI 140.

Code transmitter 150 is operable to transmit signals that are interpretable by remotely controllable electronic devices. The wireless signals transmitted by code transmitter 150 may include a device-function code. The device-function code may correspond to a code for issuing, controlling, modifying, or otherwise affecting a command, feature, action, or setting of the electronic device. Code transmitter 150 may transmit signals to the controlled electronic devices wirelessly or otherwise. The signals may comply with any of various standards, protocols, and/or formats including, as examples, the 801.11 family of standards, commonly referred to as WiFi standards, Bluetooth, infrared (IR), radio frequency (RF), and so forth.

Figure 2:
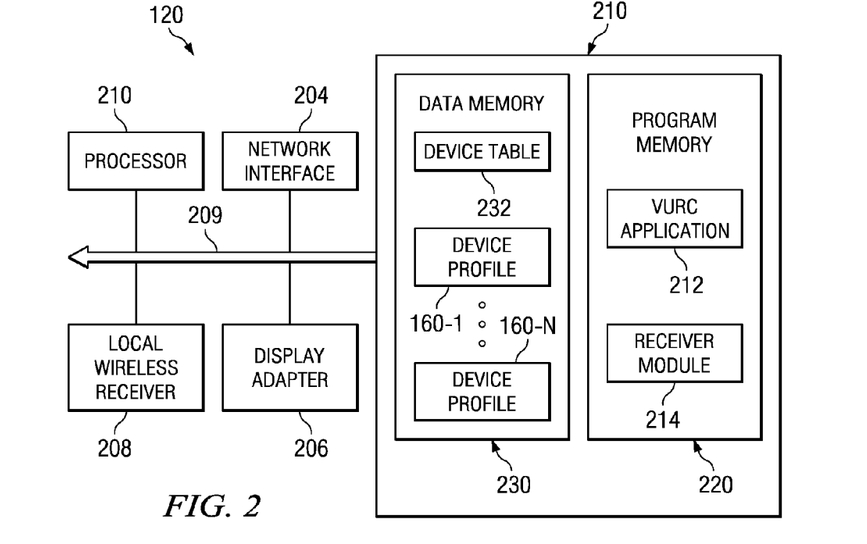
FIG. 2 is a block diagram of selected elements of an embodiment of a display controller suitable for use in a virtual universal remote control system such as the system of FIG. 1.

Turning now to FIG. 2, a block diagram illustrating selected elements of an embodiment of a display controller 120 is presented. Display controller 120 may be implemented within a STB or other suitable device for receiving multimedia content from an access network, Internet Protocol (IP)-based or otherwise, and processing the received content to make it suitable as output to a viewer of a television or other type of multimedia or video display device. In these embodiments, display controller 120 may include elements of or be connected to a network gateway (not depicted), such as a digital subscriber line or cable modem, that may provide firewall, routing, and/or network translation functionality. As depicted in FIG. 2, display controller 120 includes a processor 201 and computer readable storage 210 that is accessible to processor 201 via a bus 209. A network interface 204, a local wireless receiver 208, and a display adapter 206 are also shown operably connected to bus 209.

Network interface 204 enables display controller 120 to communicate with an external network such as the access network (not depicted) referred to above. Local wireless receiver 208 is operable to detect and interpret or otherwise process signals from a remote control device such as the VURC device 110 depicted in FIG. 1. Local wireless receive 208 may implement any of a variety of pervasive local wireless technologies including, as examples, WiFi, Bluetooth, IR, and RF technology. Display adapter 206 is operable to buffer and process multimedia content and other types of image data for presentation to display device 130. Display adapter 206 may include elements of a video decoder, an audio decoder, or both. Display adapter 206 may further include pre-decoding resources for converting content received from an access network to a stream that is suitable for an MPEG or other type of video decoder.

Storage 210 encompasses various suitable types of computer readable media including persistent as well as volatile storage elements including, as examples, hard disk or magnetic memory, solid state drives, flash memory, read only memory, removable memory media such as compact discs and digital versatile discs, dynamic read access memory, static read access memory, and other suitable storage types, or combinations thereof. As depicted in FIG. 2, storage 210 includes a first portion identified as program memory 220 and a second portion identified as data memory 230. The identification of separate instruction and data memory in FIG. 2 is a functional distinction intended for purposes of clarity and does not mandate distinct physical storage elements.

In the implementation depicted in FIG. 2, program memory 220 of storage 210 includes a VURC application 212 and a remote control (RC) module 214. Data memory 230 as depicted includes a data structure identified as device table 232 and a set of one or more data structures identified as device profiles 160-1, . . . 160-n, where n is the number of device profiles. In some embodiments, device profiles 160 correspond to respective remotely controllable electronic devices. The remotely controllable electronic devices supported by VURC application 212 may encompass any of a variety of consumer, home, and other types of electronic devices including, as examples, televisions, STBs, amplifiers, pre-amplifiers, speakers, DVD players, projectors, light switches, and so forth.

Figure 3:
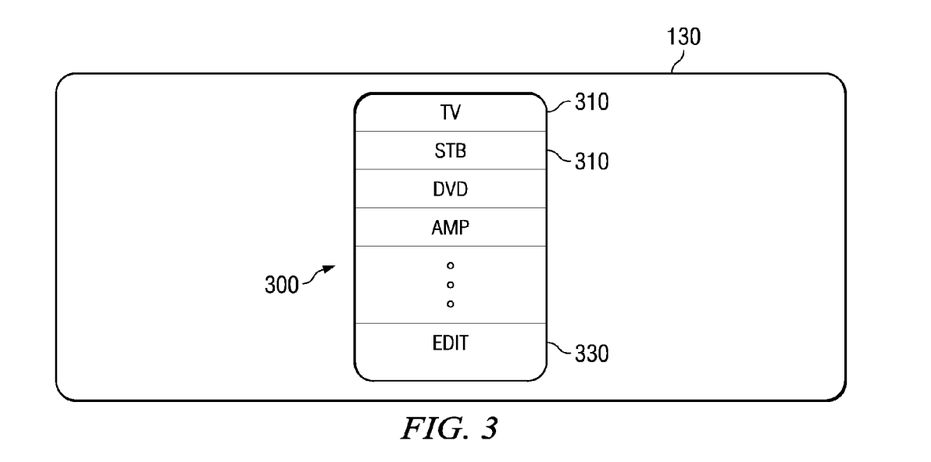
FIG. 3 illustrates selected aspects of an embodiment of a device selection interface suitable for use in a virtual universal remote control system such as the system of FIG. 1.

The user of VURC device 110 may assert functional elements 112 or 114 or another functional element not depicted in FIG. 1. In some embodiments, assertion of VURC device functional elements 112, 114 at a time when display controller 120 is outputting content to display 130 may cause VURC application 212 to generate a user interface on display device 130. The user interface might be a device table that lists a set of two or more remotely controllable electronic devices supported by VURC system 100 and VURC application 212. An exemplary of such interface is depicted in FIG. 3 as device selection interface 300. In the depicted embodiment, device selection interface 300 includes a list of entries 310 where each entry 310 identifies a corresponding electronic device supported by VURC application 212. In some embodiments, the electronic devices listed in device selection interface 300 represent the devices for which VURC system 100 has access to a device profile 160. An "edit list" entry 330 in device selection interface 300 may enable the user to add or delete the list of supported electronic devices.

Figure 4:
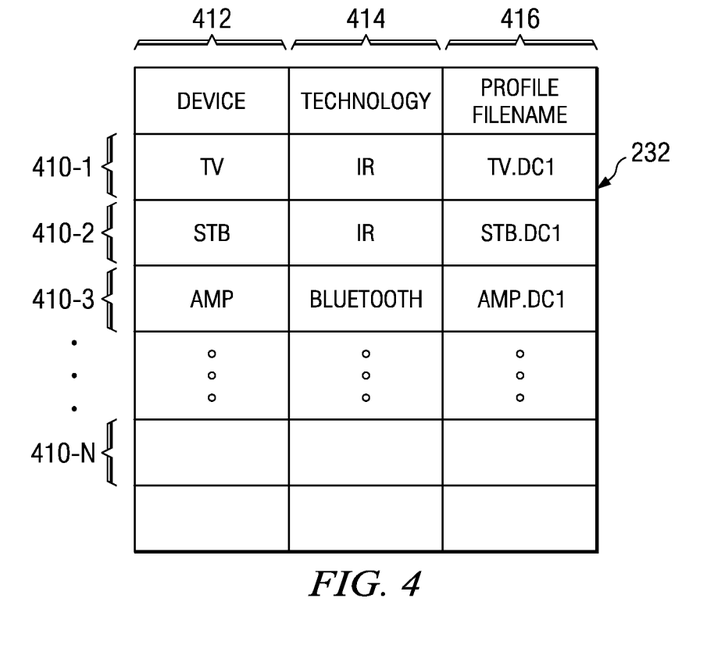
FIG. 4 illustrates selected aspects of an embodiment of a device table suitable for use in generating the device selection interface of FIG. 3.

In some embodiments, device selection interface 300 is generated by VURC application 212 in conjunction with device table 232 stored in data memory 230 of data storage 210. An exemplary embodiment of VURC device table 232 is depicted in FIG. 4. As depicted in FIG. 4, VURC device table 232 includes a set of entries 410-1 through 410-n where each entry 410 includes a set of three fields, namely, an electronic device field 412, a wireless technology field 414, and a profile filename field 416. The electronic device field 412 may include a textual or graphical indication of the electronic device that corresponds to the entry 410 in table 232. As depicted in FIG. 4, for example, the electronic device field 412 includes entries for a TV (entry 410-1), an STB (410-2), an amplifier (410-3), and so forth. VURC application 212 may use the entries in electronic device field 412 to populate the entries in device selection interface 300.

Wireless technology field 414 of device table 232 includes information indicative of the wireless technology that the corresponding electronic device 412 employs. Profile filename 416 includes a file name or other type of file descriptor indicative of a file containing a device profile 160 or other information sufficient to generate a VRDI 140 such as the one depicted in FIG. 1. Although the depicted embodiment of device table 232 is disclosed as including a specific set of fields and/or columns, other embodiments may include fewer, more, or different sets of fields and/or columns.

A user may employ VURC device 110 to cause device selection interface 300 to be displayed on display device 130. The user may then use VURC device 110 to select the TV as the electronic device to be controlled by highlighting and selecting the applicable entry 310 in device selection interface 300. In some embodiments, the user may generate the device table entry by asserting a predetermined set or sequence of selection control elements 112, 114 at any time during which the display device 130 is displaying multimedia content. For example, in some embodiments, a user may access device selection interface 300 by asserting control element 114 of VURC device 110, without first asserting any other control elements of VURC device 110, while the user is watching live or recorded content.

In other embodiments, assertion of control element 114, or another predetermined control element, may cause VURC system 100 to display the most recently accessed VRDI 140. In these embodiments, VRDI 140 may include device table control element 144. If the user highlights and selects the device table control element 144 of a VRDI 140, VURC application 212 may generate device selection interface 300 for display. In these embodiments, VURC system 100 defaults to a VRDI 140 instead of device selection interface 300 when the selection element 114 is asserted. Other embodiments may employ a different set of default procedures and the default procedures applicable to any particular client may be alterable so that, for example, the user would be able to change the default assumptions.

Figure 5:
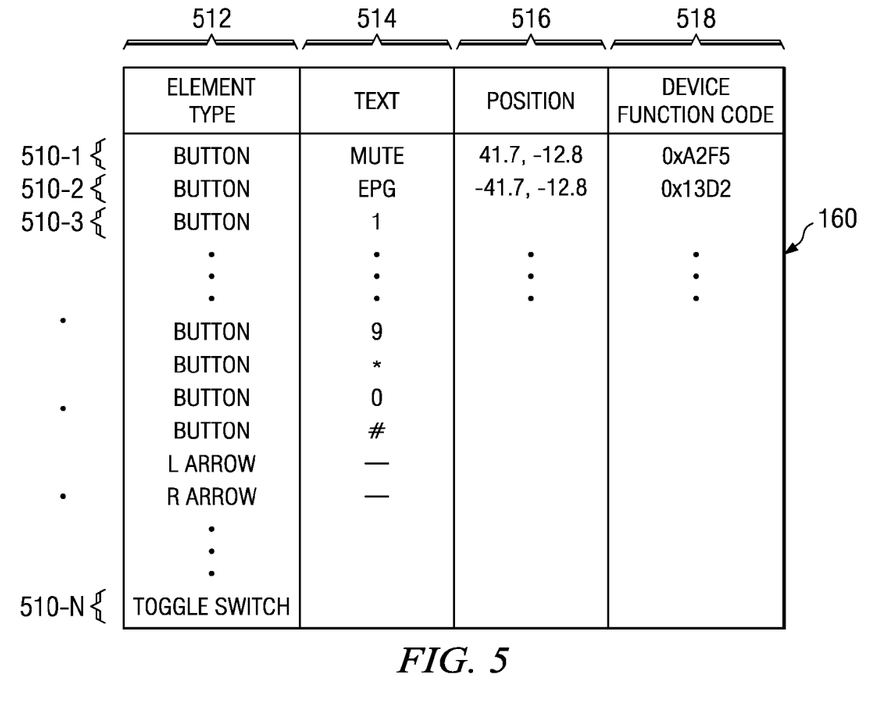
FIG. 5 illustrates selected aspects of an embodiment of a device profile suitable for use in the virtual universal remote control system of FIG. 1.

Turning to FIG. 5, selected elements of an exemplary embodiment of a device profile 160 are depicted. In the depicted embodiment, device profile 160 corresponds to a particular electronic device. Device profile 160 may include information enabling a properly configured application program such as VURC application 212 to generate, for display on a display such as display device 130, a virtual remote control interface, e.g., a VRDI 140, that is suitable for use with a corresponding electronic device. The virtual remote control interface may have the appearance of a remote control device and may even have the appearance of a remote control device that is associated with the applicable electronic device.

As depicted in FIG. 5, an exemplary device profile 160 is represented as a data table that includes a set of entries 510-1 to 510-n and a set of four fields or columns 512, 514, 516, and 518. Each entry 510 represents a control element to be depicted in a VRDI 140 (FIG. 1). Control elements are the virtual equivalents of the buttons and other control elements found on a conventional hand held remote control device.

The implementation of device profile 160 depicted in FIG. 5 includes an element type field 512, a text field 514, a position field 516, and a device-function code field 518. Other implementations of device profile 160 may include more, fewer, and/or different fields. The element type field 512 indicates the type of virtual control element to be represented. The types of elements that may be represented in a VRDI include button elements, directional or arrow elements, up/down elements including, e.g., for example, channel and volume up/down elements, slidable switches or toggle switches, and so forth. Text field 514 is an optional field for providing text that may be displayed in the VRDI on or adjacent to the corresponding control element. Position field 516 provides an indication of where the virtual control element will appear in within the VRDI.

Device-function code field 518 includes data that indicates a device-function code for the applicable control element. In a conventional remote control, assertion of a button may cause the remote control device to generate a device-function code signal that is recognized by an STB, television, or other device. Device-function codes include codes that would be transmitted by a conventional remote control device when an applicable conventional control element is asserted. The device-function code 518 depicted in FIG. 5 may be stored and/or displayed in a hexadecimal or other type of format.

Figure 6:
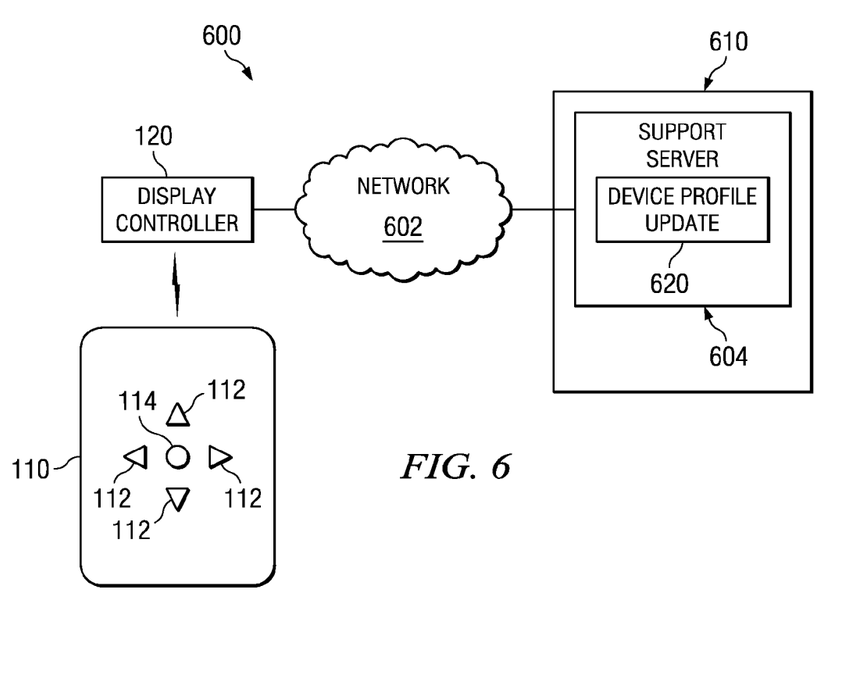
FIG. 6 illustrates selected elements of the virtual universal remote control system of FIG. 1 including elements emphasizing a method for networked updating firmware or software of a display controller such as the display controller of FIG. 2.

Turning now to FIG. 6, selected elements of a network 600 are depicted to emphasize functionality for updating or otherwise maintaining the VURC functionality within display controller 120. As depicted in FIG. 6, display controller 120 is operably connected to an external network 602, which may include portions of a private or proprietary network, a public network, or both. A support server 604 is shown as being housed, located, or otherwise maintained by a device manufacturer 610. Device manufacturer 610 represents the manufacturer of a remotely controllable electronic device. Although FIG. 6 depicts support server 604 housed in or operated by device manufacturer 610, support server 604 may be housed, maintained, and/or operated by a third party provider on behalf of device manufacturer 610.

Support server 604 as shown in FIG. 6, includes or has access to a data structure identified as device profile update 620. As suggested by its name, device profile update may include information indicative of new or improved remote control functions supported by the electronic device. Device profile update 620 may include, for example, updated device-function codes, new device-function codes representing remote control functions that were not previously available, and so forth.

In the embodiment depicted in FIG. 6, display controller 120 may, from time to time, "pull" device profile update 620 down from the network. Alternatively, support server 604 or a different server not depicted in FIG. 6, may "push" device profile update 620 out to display controller 120 from time to time. Device profile update 620 may contain replacement data for or new data to be added to an existing device profile 160. By updating an electronic device's profile 160, the configuration depicted in FIG. 6 or a suitable alternative may be employed to provide new VRDIs 140 supporting newer or improved remote control functionality.

In some embodiments, VURC device profile 160 is accessed by a VURC application program such as VURC application 212 (FIG. 2) to render or otherwise produce a VRDI 140 (FIG. 1) on display device 130 (FIG. 1). VURC system 100 may include a VURC device profile 160 for each remotely controllable electronic device that is identified in VURC device table 232 (FIG. 2) or otherwise supported by VURC system 100.

Some embodiments of the disclosed subject matter may be implemented as methods or processes and some embodiments may be implemented as computer storage media. In these embodiments, the disclosed subject matter may include computer executable instructions stored on a computer readable storage medium or a set of two or more storage media elements. These embodiments may be represented by flow diagrams that illustrate selected steps or operations performed.

Figure 7:
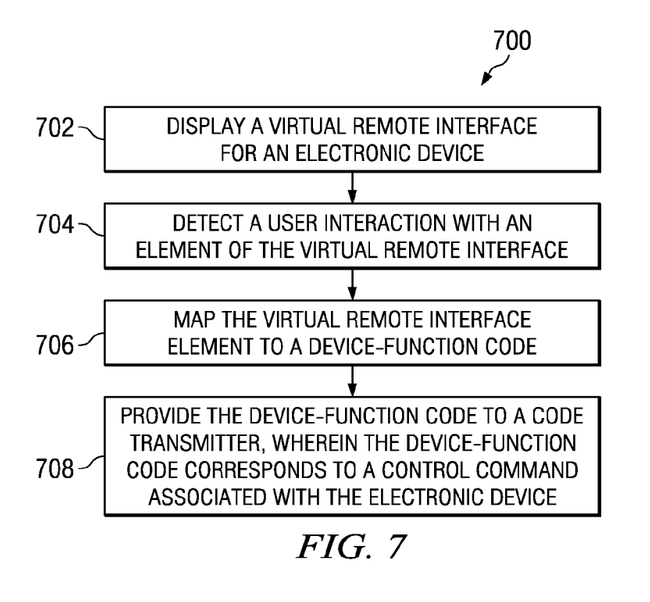
FIG. 7 is a flow diagram illustrating selected processes in an embodiment of a method enabling a virtual universal remote control feature.

FIG. 7 is a flow diagram depicting selected elements of a method 700 and a corresponding storage medium product for implementing virtual remote control functionality. In the depicted embodiment, method 700 includes displaying (block 702) a virtual remote interface for an electronic device. A user interaction with an element of the virtual remote interface is then detected (block 704) and the virtual remote interface element is mapped (block 706) to a device-function code using a table or other data structure such as a device profile 160. The device-function code is then provided (block 708) to a device-code transmitter, e.g. device code transmitter 150. The device-function code transmitted corresponds to a control command associated with the electronic device.

Figure 8:
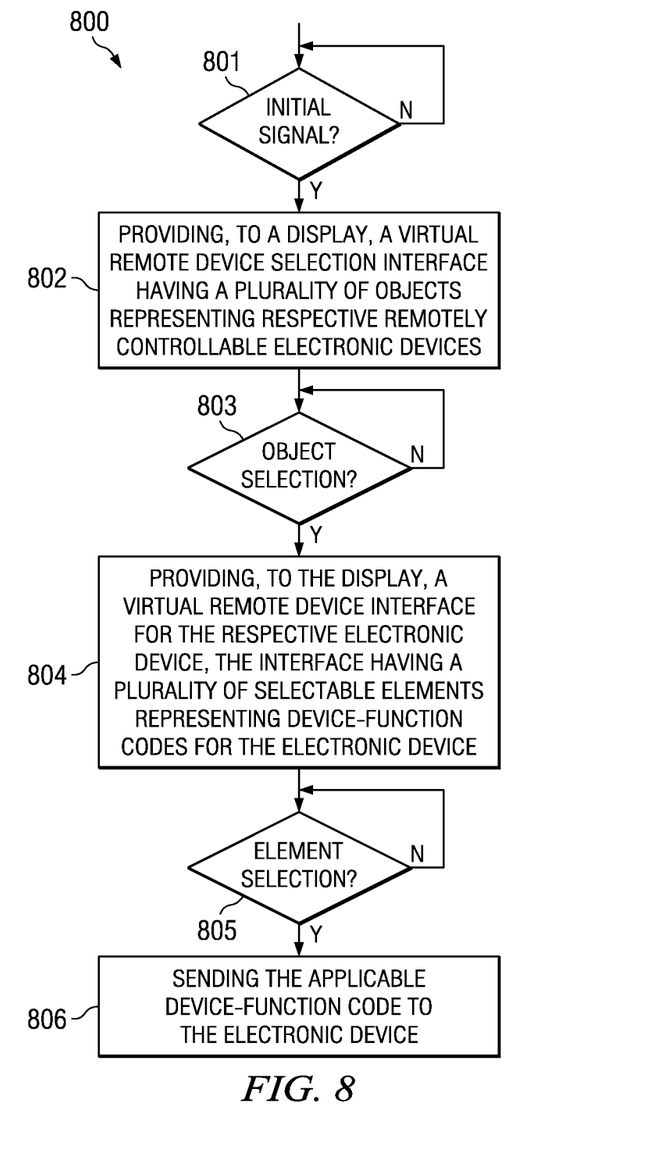
FIG. 8 is a flow diagram illustrating selected processes in an embodiment of a method enabling a virtual universal remote control feature.

FIG. 8 depicts selected elements of a method 800 for providing VURC functionality in the context of a multimedia content delivery network. Method 800 includes monitoring for (block 801) an initial signal from a remote control device. In response to detecting an initial signal, a virtual remote device selection interface is provided (block 802) to a display. The virtual remote device selection table may include a plurality of objects representing respective remotely controllable electronic devices. Method 800 as shown further includes detecting (block 803) a selection of one of the plurality of objects and, in response thereto, providing (block 804) a VRDI for the respective electronic device to the display. The VRDI may include a plurality of selectable elements representing device-function codes for the electronic device. In response to detecting (block 805) selection of one of the selectable elements, method 800 as depicted further includes sending (block 806) the respective device-function code to the electronic device.

Figure 9:
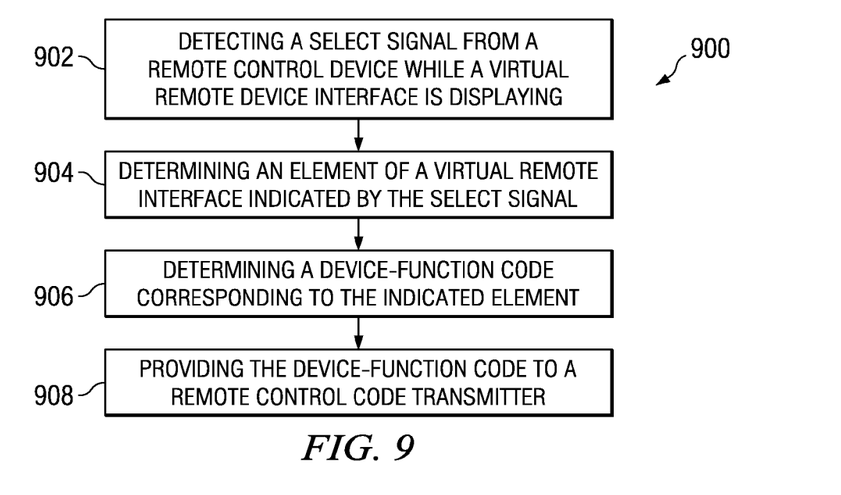
FIG. 9 is a flow diagram illustrating selected processes in an embodiment of a method enabling a virtual universal remote control feature.

FIG. 9 depicts selected elements of a method 900 for providing virtual, universal remote control. Method 900 as shown in FIG. 9 includes detecting (block 902) a select signal from a remote control device while a VRDI is displaying. An element of a virtual remote interface indicated by the select signal is determined (block 904) and a device-function code corresponding to the indicated element is determined (block 906). The device-function code is then provided (block 908) to a remote control code transmitter.

Figure 10:
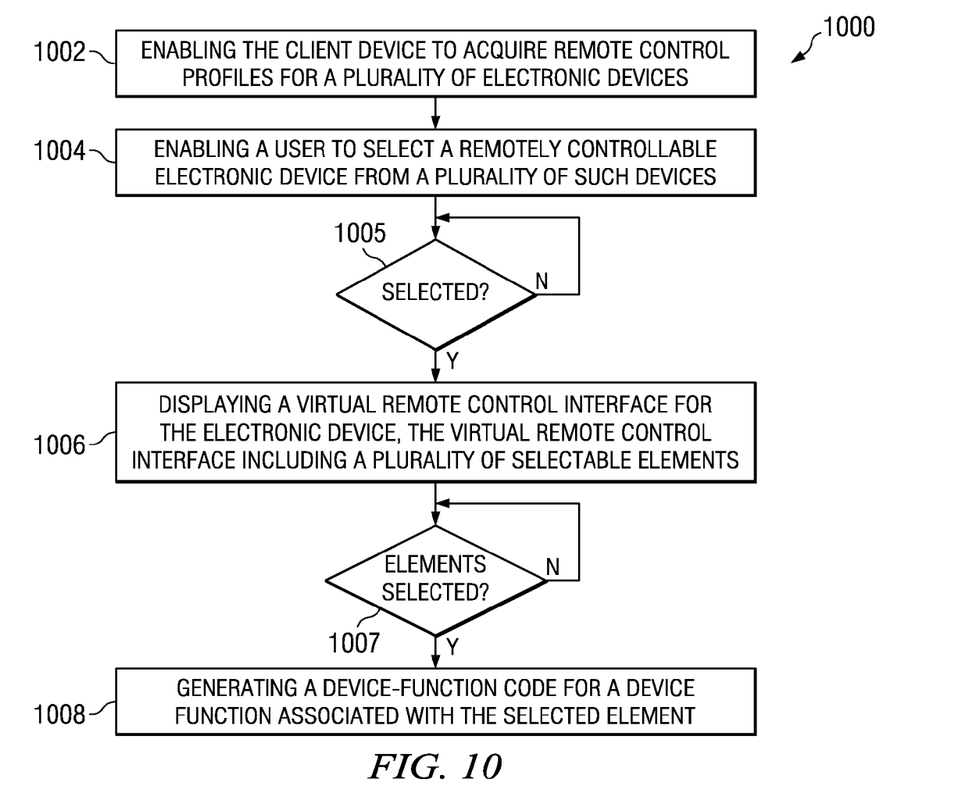
FIG. 10 is a flow diagram illustrating selected processes in an embodiment of a method enabling a virtual universal remote control feature.

FIG. 10 depicts selected elements of a service 1000 supporting or delivering VURC functionality to an end user environment. Method 1000 as depicted in FIG. 10 includes enabling (block 1002) the client device to acquire remote control profiles for a plurality of supported electronic devices. A user is then enabled (block 1004) to select a remotely controllable electronic device from the plurality of supported devices. When the user selects (block 1005) a remotely controllable electronic device, a virtual remote control interface for the electronic device is displayed (block 1006). The virtual remote control interface may include a plurality of selectable control elements. In response to the user selecting (block 1007) an element, method 1000 then generates (block 1008) a device-function code for a device function associated with the selected element.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A computer readable storage medium including processor executable instructions that, when executed by a processor, cause the processor to perform operations comprising:
   accessing a device profile corresponding to an electronic device, wherein the device profile indicates location information and label information for a set of control elements;
   providing an interface, wherein the interface depicts the control elements corresponding to the electronic device positioned on a display based on the location information; and
   responsive to receiving one of a limited set of remote control signals from a limited function remote control device:
      identifying one of the control elements displayed in the interface;
      identifying a device-function code associated with the control element identified; and
      transmitting the device-function code;
   wherein the limited set of remote control signals includes a set of directional signals and a single additional signal for selecting.

2. The computer readable storage medium of claim 1, wherein the operations include displaying the interface, and further wherein the interface includes a set of selectable objects and wherein each selectable object corresponds to a different electronic device.

3. The computer readable storage medium of claim 1, wherein the device profile indicates the device-function code.

4. A customer premises equipment, comprising:
   a processor; and
   a computer readable storage medium accessible to the processor and including processor executable instructions that, when executed by the processor, cause the processor to perform operations comprising:
   accessing a device profile corresponding to an electronic device, wherein the device profile indicates location information and label information for a set of control elements;
   providing an interface, wherein the interface depicts the control elements corresponding to the electronic device positioned on a display based on the location information; and
   responsive to receiving one of a limited set of remote control signals from a limited function remote control device:
      identifying one of the control elements displayed in the interface;
      identifying a device-function code associated with the control element identified; and
      transmitting the device-function code;
   wherein the limited set of remote control signals includes a set of directional signals and a single additional signal for selecting.

5. The customer premises equipment of claim 4, wherein the customer premises equipment is a set top box configured to process content received via an Internet protocol television network.

6. The customer premises equipment of claim 4, wherein the device profile includes information indicative of the plurality of device-function codes.

7. The customer premises equipment of claim 4, wherein the operations include operations for initiating wireless transmission of a signal indicative of the device-function code.

8. The customer premises equipment of claim 7, wherein initiating the wireless transmission comprises accessing a device table and initiating the wireless transmission according to a wireless transmission technology indicated in the device table.

9. The customer premises equipment of claim 4, wherein the operations include operations for receiving device profile updates via an Internet protocol network and for updating the device profile.

10. A method comprising:
   accessing a device profile corresponding to an electronic device, wherein the device profile indicates location information and label information for a set of control elements;
   providing an interface, wherein the interface depicts the control elements corresponding to the electronic device positioned on a display based on the location information; and
   responsive to receiving one of a limited set of remote control signals from a limited function remote control device:
      identifying one of the control elements displayed in the interface;
      identifying a device-function code associated with the control element identified; and
      transmitting the device-function code;
   wherein the limited set of remote control signals includes a set of directional signals and a single additional signal for selecting.

11. The method of claim 10, further comprising providing the device-function code to a remote control code transmitter.

12. The method of claim 11, wherein the providing includes wirelessly transmitting the device-function code to the remote control code transmitter.

13. The method of claim 10, wherein the transmitting includes wirelessly transmitting the device-function code.

14. The method of claim 10, wherein the virtual remote interface highlights a pre-designated control element in response to a directional signal from a remote control device operated by the user.

15. The method of claim 10, wherein the transmitting includes transmitting the device-function code to a set-top box.

* * * * *